United States Patent [19]
Stadtfeld et al.

[11] Patent Number: 5,800,103
[45] Date of Patent: Sep. 1, 1998

[54] METHOD OF MACHINING DURING INDEXING

[75] Inventors: Hermann J. Stadtfeld, Rochester; William D. McGlasson, Caledonia; Kent D. Yunker, Rochester, all of N.Y.

[73] Assignee: The Gleason Works, Rochester, N.Y.

[21] Appl. No.: 798,083

[22] Filed: Feb. 12, 1997

Related U.S. Application Data

[60] Provisional application No. 60/015,380, Feb. 29, 1996.

[51] Int. Cl.$^6$ .................................................. B23F 9/10
[52] U.S. Cl. ........................... 409/27; 409/26; 409/43; 409/51; 451/47; 451/147
[58] Field of Search ........................... 451/47, 147, 219, 451/275; 409/26, 27, 28, 29, 43, 51

[56] References Cited

U.S. PATENT DOCUMENTS

| | | | |
|---|---|---|---|
| 2,196,087 | 4/1940 | Staples et al. | 409/27 |
| 2,339,375 | 1/1944 | Cassel | 409/26 |
| 2,667,818 | 2/1954 | Stewart et al. | 409/26 |
| 2,773,429 | 12/1956 | Wildhaber | 409/26 |
| 2,824,498 | 2/1958 | Baxter, Jr. et al. | 409/26 |
| 2,932,239 | 4/1960 | Wildhaber | 409/26 |
| 2,947,223 | 8/1960 | Carlsen et al. | 409/29 |
| 3,288,031 | 11/1966 | Krastel et al. | 409/26 |
| 4,353,671 | 10/1982 | Kotthaus | 409/26 |
| 4,525,108 | 6/1985 | Krenzer | 407/22 |
| 4,981,402 | 1/1991 | Krenzer et al. | 409/26 |
| 5,044,127 | 9/1991 | Ryan | 451/47 |
| 5,080,537 | 1/1992 | Takano et al. | 409/29 |
| 5,257,882 | 11/1993 | Stadtfeld et al. | 409/26 |
| 5,310,295 | 5/1994 | Palmateer, Jr. et al. | 409/13 |
| 5,374,142 | 12/1994 | Masseth | 407/23 |

FOREIGN PATENT DOCUMENTS

| | | |
|---|---|---|
| 0059992 | 9/1982 | European Pat. Off. . |
| 590105 | 7/1977 | Switzerland . |

OTHER PUBLICATIONS

Goldrich, Robert N., "CNC Generation of Spiral Bevel and Hypoid Gears: Theory and Practice", The Gleason Works, presented at ECAM Conference, Lyon, France, Jun. 20–22, 1990.

Patent Abstracts of Japan, vol. 95, No. 3, Apr. 28, 1995, Japanese Patent Publication No. 06-339811 published Dec. 13, 1994, Nissan Motor Co.

*Primary Examiner*—A. L. Pitts
*Assistant Examiner*—Christopher Kirkman
*Attorney, Agent, or Firm*—Robert L. McDowell; Ralph E. Harper

[57] ABSTRACT

A method of machining one or more tooth slots in a bevel gear-shaped workpiece with a cup-shaped tool having one or more stock removing surfaces. The method comprises indexing the workpiece by rotation about a workpiece axis to bring one of the tooth slots to a final machining position. Simultaneously with at least a portion of the indexing, positioning the tool to contact the workpiece to commence machining the slot and infeeding the tool during the indexing while moving the tool with the indexing workpiece to maintain the tool positioned in the slot. The infeeding, movement of the tool, and indexing continuing at least until the final machining position is achieved.

15 Claims, 3 Drawing Sheets

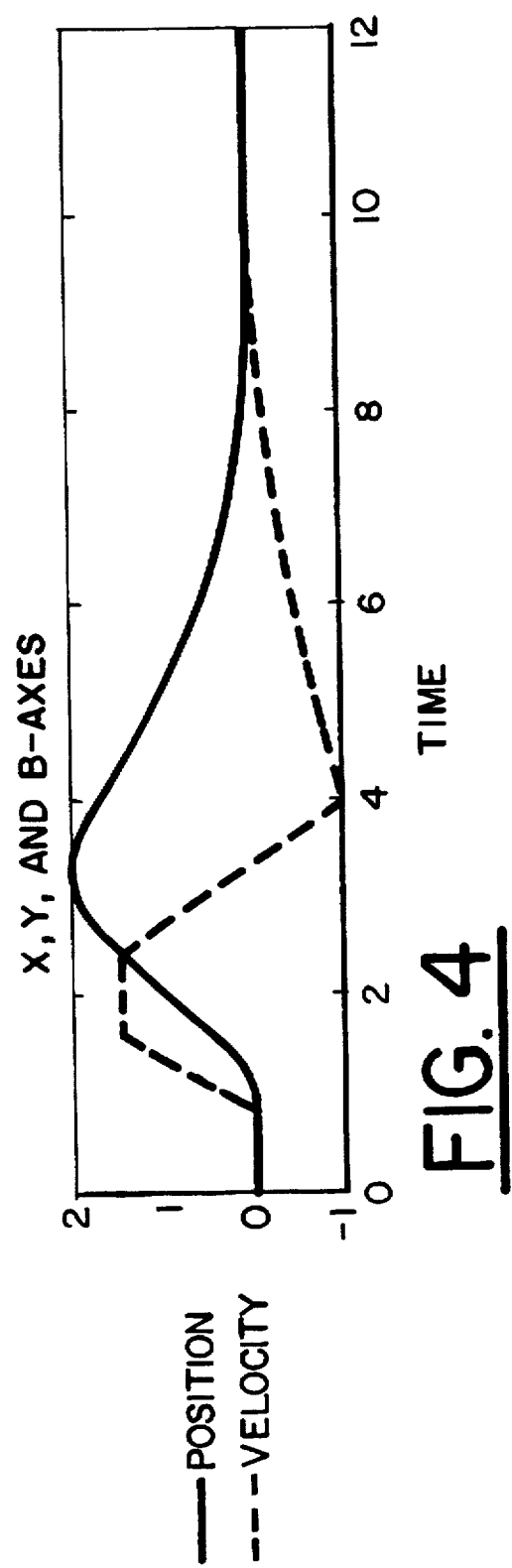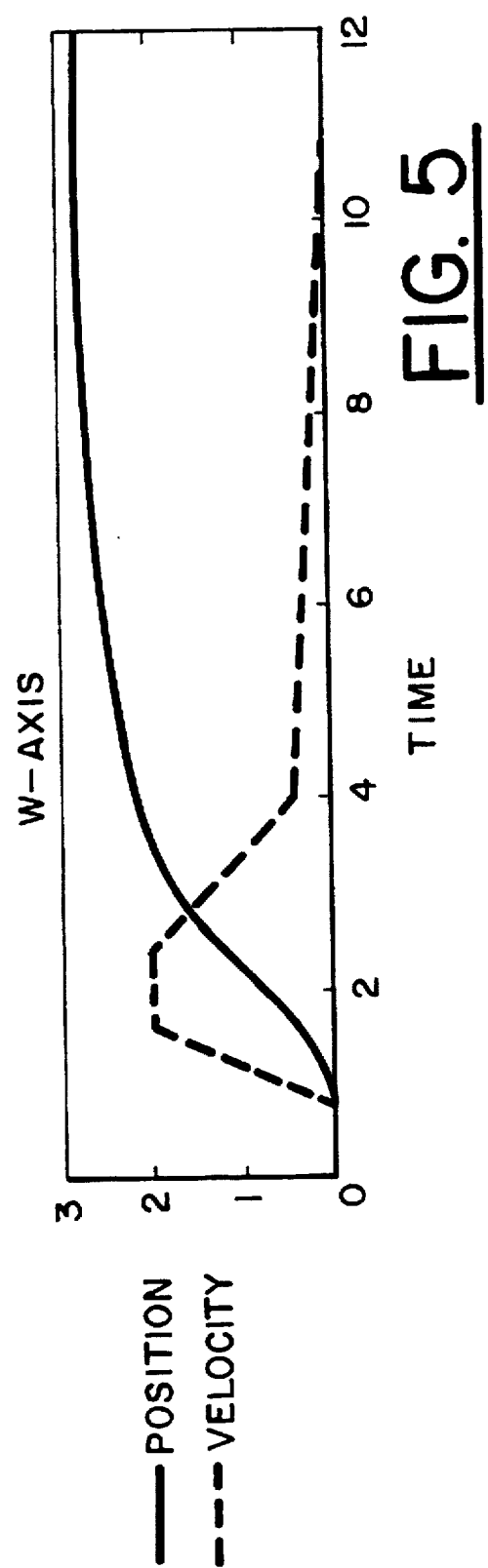

METHOD OF MACHINING DURING INDEXING

This application claims benefit of USC Provisional Application Ser. No. 60/015,380, filed Feb. 29, 1996.

FIELD OF THE INVENTION

The present invention is directed to a method for machining gears and the like, especially bevel and hypoid gears. In particular, the present invention is directed to a method of machining wherein machining of the workpiece occurs during indexing of the workpiece.

BACKGROUND OF THE INVENTION

In the context of the specification and its claims, reference will be made to "bevel" gears. This reference is intended to include gears that are generally conical in form and operate on intersecting axes but is also intended to include those gears which operate on non-parallel, non-intersecting axes such as, for example, hypoid gears.

The formation of bevel gears by non-generating processes, that is, processes employing no machine cradle roll or equivalent thereof and wherein the profile shape of the tool is imparted to the workpiece, may be accomplished by a plurality of methods among which are face milling and face hobbing.

Non-generated face hobbing comprises cutting blades arranged in groups, usually pairs, about the cutter head. Face hobbing comprises each group of cutting blades passing through a tooth slot with each blade in the group forming a cut completely along the longitudinal portion of the tooth slot. The face hobbing process is such that more than one blade is present in the tooth slots at any given time. The cutter and the workpiece rotate in a timed relationship to each other thereby allowing continual indexing of the workpiece and continual formation of each tooth slot of the gear.

In non-generated face milling methods, the workpiece is held against rotation and the cutting tool is plunged into a workpiece to full depth to form a tooth slot (i.e. tooth space) thus producing opposing sides of adjacent teeth. After a short dwell period at full depth to ensure formation of the desired slot, the tool is withdrawn from the slot, the workpiece is then indexed to the position of the next tooth slot by rotation of the workpiece and the cutting process is repeated. It should be noted that the tool most commonly utilized for non-generating cutting processes comprises cutting blades arranged in a circle about a cutter head, with the cutting blades being in line with each other such that a circle is formed by the tips of the cutting blades when the tool is rotated.

Subsequent to the cutting operation, the face-milled workpiece is usually heat treated and then finish machined such as by lapping or grinding, although finish cutting operations are also employed in some instances.

One method of grinding bevel gears is with a generally cup-shaped grinding wheel in which the process steps are analogous to face milling. The same process steps are followed: plunging the grinding wheel into a tooth slot, dwelling for a period of time to allow grinding wheel to remove all stock material or "spark out", withdrawing the grinding wheel, and, indexing the workpiece to the next tooth slot.

In both face-milling cutting and grinding operations, the time necessary to allow the workpiece to be indexed to the next tooth slot location is considerable. In grinding, it is estimated that the time for indexing is equal to about 30 to 60 percent of the grinding time. The indexing time represents idle time in which no machining is occurring and hence, production of a desired part on a particular machine is effectively halted while indexing is taking place. When the amount of indexing time is considered as a whole, such as the total amount of time dedicated to indexing during an entire day, week, month, etc., the amount of time that no machining is occurring is substantial, and so are the costs related to this non-productive time.

It is, therefore, an object of the present invention to provide a method of machining in which non-productive time related to indexing is reduced.

It is a further object of the present invention to provide a method of machining in which machining occurs simultaneously with at least a portion of the indexing thus making productive use of this formerly idle machining time and improving cycle time and process quality.

SUMMARY OF THE INVENTION

The present invention is directed to a method of machining one or more tooth slots in a bevel gear-shaped workpiece with a generally cup-shaped tool having one or more stock removing surfaces. The tooth slots including a root portion having a lengthwise curvature in the form of a circular arc.

The method comprises indexing the workpiece by rotation about a workpiece axis of rotation to bring one of the tooth slots to a final machining position. Simultaneously with at least a portion of the indexing, the tool is positioned to contact the workpiece to commence machining the slot. The tool is fed into the slot during the indexing while the tool is moved with the indexing workpiece to maintain the tool positioned in the slot. The infeeding, movement of the tool, and the indexing are continued at least until the final machining position is achieved.

The tool may be either a cutting tool or grinding wheel and the indexing may be intermittent or continuous.

BRIEF DESCRIPTION OF THE DRAWINGS

FIG. 4 graphically shows the representative position and velocity of machine axes (X), (Y), and (B) during indexing according to the present invention.

FIG. 5 graphically shows an alternative position and velocity of the workpiece axis (W) during indexing according to the present invention.

DETAILED DESCRIPTION OF THE PREFERRED EMBODIMENT

The invention will now be discussed with reference to the accompanying drawings.

Figure 1:
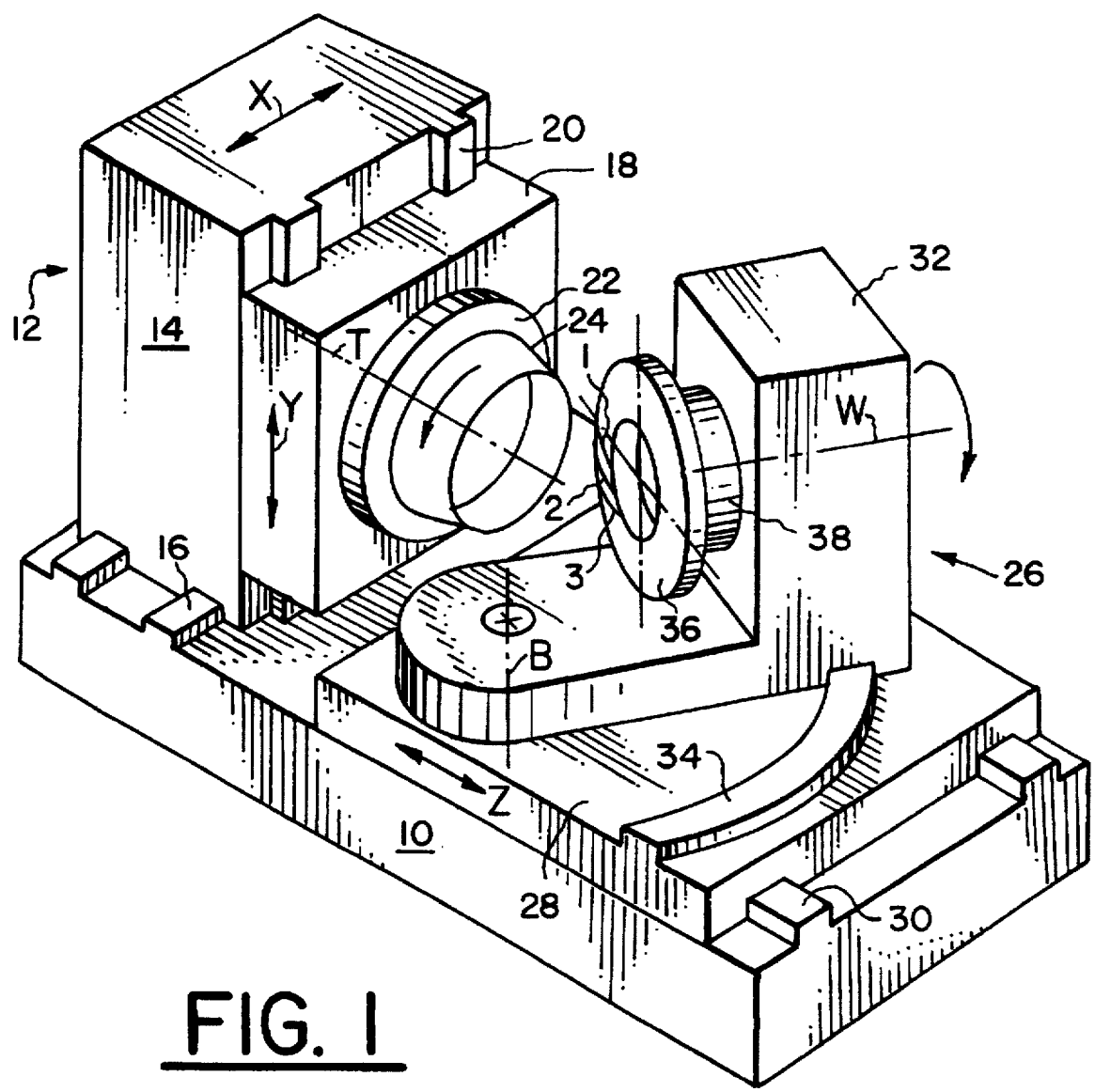
FIG. 1 schematically illustrates a machine for carrying out the present inventive process.

The present inventive method may be accomplished on any machine capable of positioning a tool and workpiece relative to one another along and/or about three mutually perpendicular axes. A preferred bevel gear manufacturing machine for carrying out the present inventive process is shown in FIG. 1. The machine is of the type disclosed in U.S. Pat. No. 4,981,402 to Krenzer et al. comprising linear and rotational relative movement between the tool and workpiece along and/or about three mutually orthogonal axes and is computer numerically controlled (CNC).

The bevel gear manufacturing machine comprises a base 10, and a tool support 12 and workpiece support 26 positioned on the base 10. Tool support 12 comprises tool carriage 14 movable along the width (X-axis) of machine base 10 on ways 16, and tool head 18 movable perpendicular (Y-axis) with respect to machine base 10 on ways 20 positioned on carriage 14. A tool spindle 22 is rotatably positioned in tool head 18 and a tool 24 is releasably mounted to the tool spindle 22 for rotation about a tool axis (T). In FIG. 1, tool 24 is shown to be a generally cup-shaped grinding wheel, however, the present invention also contemplates tool 24 being of the cutting type comprising a plurality of cutting blades.

Workpiece support 26 includes work table 28 movable on ways 30 along the length (Z-axis) of the machine base 10, and work head 32 movable in an arcuate path on way 34 to provide pivoting about a pivot axis (B-axis). Workpiece 36 is releasably mounted to a rotatable work spindle 38 positioned in work head 32 for rotation of the workpiece about a work axis (W).

Movement of tool spindle 22, work spindle 38, work head 32, table 28, tool head 18 and carriage 14 is imparted by separate drive motors (not shown). The above-named components are capable of independent movement with respect to one another and may move simultaneously with one another. Each of the respective motors is associated with a feedback device such as either a linear or rotary encoder (not shown) as part of a CNC system which governs the operation of the drive motors in accordance with instructions input to a computer (not shown). The encoders provide feedback information to the computer concerning the actual positions of each of the movable components. Machines such as shown in FIG. 1 are capable of positioning a tool relative to a workpiece in almost any position within the operational limits of the machine. Furthermore, these machines are capable of very fast and accurate positioning of components along or about the linear or rotational axes.

In machining bevel gears by non-generated face milling, the practice heretofore has been to bring the workpiece into position relative to the tool such that a particular slot location on the workpiece is machined by plunging the tool to a specified depth into the workpiece. In this type of process, the form of the tool is imparted to the workpiece. In other words, the profile shape of the stock removing surface (or surfaces) of the tool will form a tooth slot having the same profile shape as the tool.

In order to form the correct tooth surfaces on the workpiece, it follows that a correct tooth slot must be formed. The desired geometry of the tooth surfaces can only be realized when the tool axis and workpiece axis are in the proper position relative to one another. There is only one unique and precise position for the tool axis in which the tool, at full depth position in the workpiece, will form the desired geometrically correct tooth slot. In this position, the tip portion of the tool is complementary with the root portion of the desired tooth slot and the flanks of the tool are also complementary with the tooth flanks of the desired tooth. For non-generated face milling processes, this machining position is known as the "plunge" position and is shown, for example, at position 1 in FIG. 1.

In the prior art, plunge position 1 described above is assumed by the workpiece 36. Tool 24 is then fed relatively into the workpiece 36 to a full depth position to form the desired tooth slot. Tool 24 is then withdrawn and the workpiece 36 is indexed to bring the next tooth slot from location 2 to the same machining position 1 occupied by the previous tooth slot and the tooth slot at position 3 would accordingly be indexed to position 2. Tool 24 is again plunged into the workpiece 36 and withdrawn. The slot originally located at position 3 is then indexed to machining position 1 and machining commences again. The process of indexing, machining, and withdrawing is repeated until all tooth slots on the workpiece are formed.

In the prior art, the time dedicated to indexing has been considerable. During indexing, no machining occurs and this idle machining time is unproductive. The inventors have discovered that unproductive indexing time can be considerably reduced by beginning the machining process during the actual indexing of the workpiece.

As stated above, there is only one tool axis position relative to the intended workpiece tooth slot to be machined that provides the correct tooth slot profile at full tool depth. The inventors have discovered, however, that initial contact and infeeding of the tool relative to the workpiece may take place as the workpiece is being indexed to the "plunge" position 1 as seen in FIG. 1. Since, in the context of the present invention, machining is taking place prior to the "plunge" position being attained, position 1 will hereafter be more appropriately referred to as the "final machining" position. However, it is to be clearly understood that the relative positioning of the tool and workpiece in the final machining position is equivalent to their relative position in the "plunge" position.

The inventors have found that beginning the infeed of the tool prior to reaching final machining position 1 reduces idle machining time thus making the machining process more productive while also providing the capability to shorten the time necessary to machine a workpiece. This shortened cycle time results from reducing the indexing travel required of the workpiece between tool contact with successive tooth slots being machined, that is, the amount of indexing travel by the workpiece while not in contact with the tool is reduced.

In practice, as rotation of the workpiece 36 begins in order to index a tooth slot location, such as from position 2 to final machining position 1, the tool 24 is moved relatively along or about one or more of the appropriate machine axes to move the tool toward and into contact with the workpiece 36 at some point along the path of indexing. As indexing of the workpiece continues, the tool is fed into the workpiece while simultaneously following the rotating workpiece by movements along one or more of the X, Y, and B axes to maintain the tool center in a constant position relative to the center of the tooth slot to accomplish the desired stock removal without violating the final tooth slot shape produced at the final machining position.

Once final machining position 1 is reached, there are two procedures that may be followed. The first procedure is that workpiece indexing is stopped and the tool, subsequent to any additional infeed required to reach its full depth position in the tooth slot, is preferably allowed to dwell in the tooth slot for a predetermined period of time to ensure all stock is removed from the slot. The tool is then withdrawn and indexing of the workpiece is again commenced with the tool being repositioned via the linear and pivot axes to contact the workpiece at the next tooth slot location during indexing as described above. With this procedure, the machining time required for the workpiece is shortened since a portion of the indexing is incorporated with the actual machining time.

Figure 2:
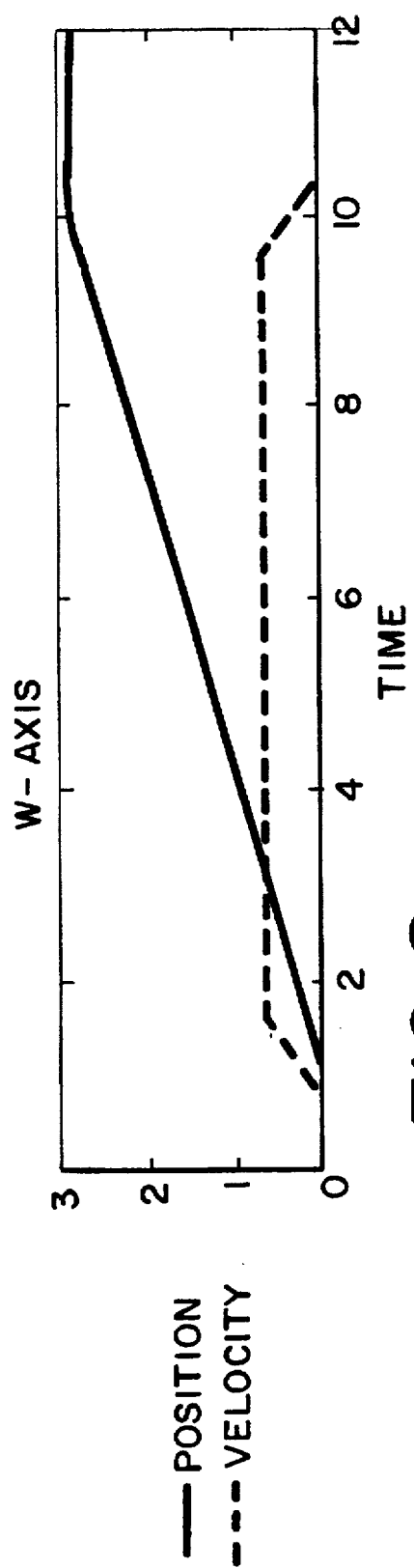
FIG. 2 graphically shows the position and velocity of the workpiece axis (W) during indexing according to the present invention.
Figure 3:
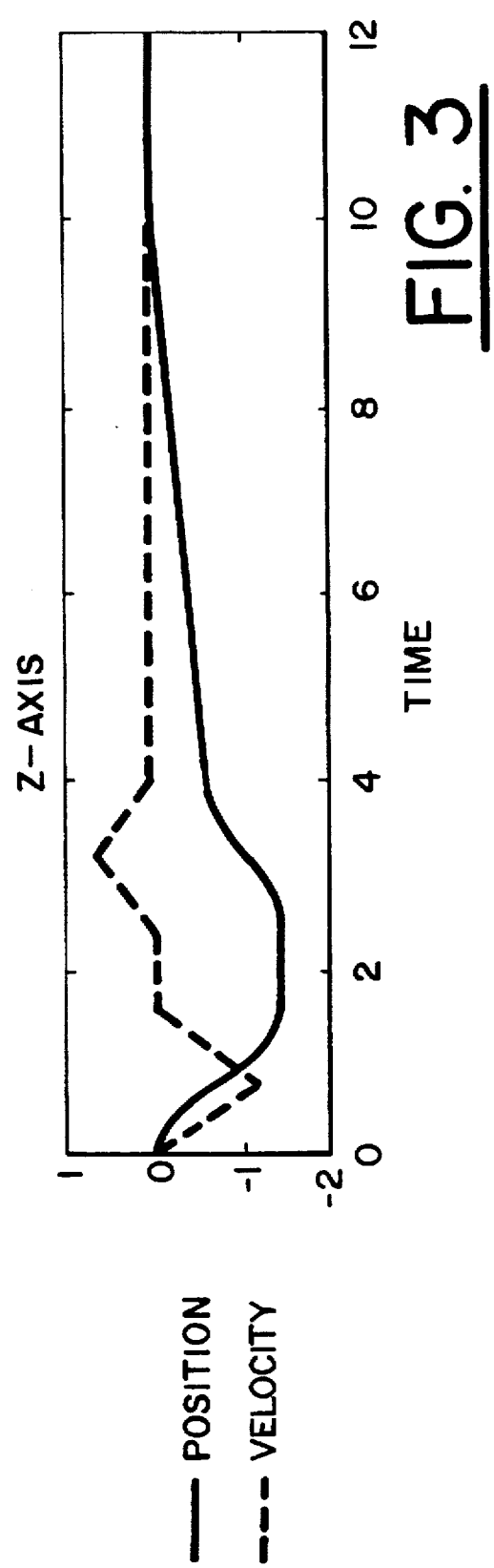
FIG. 3 graphically shows the position and velocity of the tool feed axis (Z) during indexing according to the present invention.

An example of the procedure described above for machining a tooth slot is graphically shown in FIGS. 2, 3 and 4 which illustrate the position and velocity in units of magnitude of the indicated machine axes relative to units of time. For the first unit of time, the only axis in motion is the feed axis (Z) as seen in FIG. 3 which moves in the negative direction to withdraw the tool from a machined tooth slot. As soon as the tool begins its withdrawal from the tooth slot, the workpiece axis (W) as seen in FIG. 2 and the remaining machine motion axes (X), (Y), and (B) represented in FIG. 4 all begin to move to commence indexing, as shown by the increasing workpiece velocity and position values in FIG. 2, and to reposition the tool (FIG. 4) to contact the next tooth slot as it is indexed toward the final machining position 1 as shown in FIG. 1. Of course it is to be understood that for indexing and repositioning, sufficient tool withdrawal is initially effected to permit adequate clearance between the tool and flank surfaces of the teeth to prevent interference when such indexing and repositioning movements commence.

Looking at FIG. 2, it can be seen that the velocity of workpiece indexing remains constant which yields a constant rotational change (positive slope) in the workpiece position until the final machining position is reached at about 10 units of time where a slowing of the rotational velocity is noted as is a leveling-off in the change in workpiece rotational position (i.e. workpiece indexing is stopped).

While the workpiece is indexing at a constant rate as shown in FIG. 2, the feed axis Z (FIG. 3) is withdrawn prior to 2 time units. There may be a brief stop in the feed motion while the other machine axes are repositioned (FIG. 4) and then the tool begins to advance, at first quickly as shown by the increase in velocity and then slowing upon contact with the workpiece at about 4 time units to a constant velocity and accompanying steady infeed until the final machining position is reached at about 10 time units. The remaining machine axes, as shown in FIG. 4, are quickly repositioned as seen by the steep slopes of both position and velocity from about 1 to about 4 units of time and from thereon the axes show a steady change in both position and velocity as this portion of FIG. 4 represents the constant repositioning of the tool necessary to follow the indexing of the workpiece.

FIG. 5 illustrates an alternative to the steady indexing shown in FIG. 2. Following withdrawal of the tool, the velocity of indexing increases quickly as does the accompanying positional change to the workpiece. In this manner, most of the amount of indexing is accomplished prior to contact with the tool at about 4 time units where a more steady change in velocity and position is begun and continued through the final machining position at about 10 units of time. The Z-axis and the X, Y and B axes changes accompanying this indexing are essentially the same as shown in FIGS. 3 and 4.

The second procedure that may be performed upon the tool and workpiece reaching final machining position 1 comprises an immediate withdrawal of the tool while indexing of the workpiece continues, followed by a rapid repositioning of the tool via the machine axes to contact the workpiece at the next tooth slot location prior to that particular slot location reaching final machining position 1 as described above. Of course with this procedure, it can be understood that infeeding of the tool be completed to full depth simultaneously with arrival of the tool and workpiece at machining position 1 since withdrawal of the tool is effected immediately and the workpiece continues to index.

Hence, there is essentially no opportunity for further tool infeeding once final machining positioning 1 is reached. With this continuous procedure, the amount of time to machine the workpiece is faster than in the above first procedure, cutting the time to machine a workpiece in about half of that necessary in the prior art.

An advantage of the present invention is that with initial tool contact and plunging taking place prior to the final machining position, the large forces encountered with initial machining take place while the workpiece is rotating (indexing) and do not occur in the final machining position. Given this, any work position errors, such as work spindle slippage or backlash due to high torque loads, can be measured and corrected by the computer controller prior to the tooth slot reaching the final machining position, thus avoiding the more difficult procedure of measuring and correcting position errors when workpiece rotation is stopped. When the final machining position is reached, the bulk of stock material has been removed from the tooth slot and hence, machining forces are considerably lower thus enabling the work spindle drive mechanism to precisely position the workpiece in the final machining position which enhances tooth geometry and spacing accuracy.

Still another advantage of the present invention is that while indexing and machining are taking place concurrently, the movement of the tool to maintain its position with respect to the rotating workpiece brings about a change in the angular position of the tool with respect to the flanks of the teeth being machined. This movement introduces a kind of roll motion which can be understood as generating the form of the tooth flanks being produced. The reason for the roll motion is that the start of machining occurs below or above the exact plunging position (i.e. machining position 1). By this rolling motion, contact between the tool and workpiece is one or more limited elliptical areas rather than the entire flank surface. This type of contact reduces burning in grinding operations.

The present invention also can be effective in controlling tool wear. It is common in many gears to have uneven pressure angles on opposed tooth surfaces. In non-generated face milling methods, the profile shape of the tool has a complementary shape to that of the tooth slot and, hence, the pressure angles of opposite sides of the tool also comprise uneven pressure angles. In this situation with prior art plunge-type processes, uneven tool wear due to the uneven pressure angles of the tool sides has been observed. The present invention enables tool wear due to uneven pressure angles to be lessened by providing the freedom to reverse the direction of workpiece rotation during indexing, thus balancing the wear on the tool. For example, FIG. 1 illustrates a clockwise rotation of workpiece 36 when slot position 2 is indexed to final machining position 1. With the present invention, the direction of indexing of workpiece 36 could instead be in a counter-clockwise direction. The tool 24 would contact workpiece 36 at a location above final machining position 1 and follow the counter-clockwise rotation of the workpiece to the final machining position 1.

During the plunging and indexing, the plane containing the circular path of the tool tips is not substantially parallel to the tooth root portion as is usually the case when machining position 1 is achieved. However, as the workpiece and tool move toward the final machining position 1, their relative position changes such that at the moment final machining position 1 is reached, the tool and workpiece will be in the proper positions to meet this condition. If desired, an additional adjustment of the pivot axis (B) can be done to keep the tool tip circle substantially parallel during the entire infeeding of the tool.

The present invention is intended to include contacting the tool with a tooth slot location at any index position during rotation of the workpiece. Referring to FIG. 1 for example, the tool may contact a tooth slot location prior to or simultaneously with the commencement of indexing. In this manner, tool 24 would contact workpiece 36 at position 2 and then indexing would begin with the tool 24 following the rotation of workpiece 36 to final machining position 1. In another and more preferred example, as the tool 24 is withdrawn from a finished tooth slot at position 1, indexing of the workpiece 36 would immediately begin and simultaneously the tool would be repositioned to contact the next tooth slot at an indexing location between positions 2 and 1 and then follow the rotation of the workpiece to final machining position 1. Of course, if a continuous process as previously described is being utilized, the latter of these examples would be followed. It should also be understood that contact with the workpiece could also be at a tooth slot location wherein the slot contacted was not the adjacent slot. For example, in FIG. 1, after the slot at position 1 is finished, the tool may be moved to contact the slot shown at position 3 in either manner as described above.

If desired, additional relative motions between the tool and workpiece can be effected simultaneously with indexing to modify tooth surface geometry and produce tooth surfaces other that that which are complementary to the profile form of the tool. Also, additional relative motions between the tool and workpiece can be effected subsequent to the final machining position being achieved in order to alter the tooth geometry by modifying the tool-complementary or "plunge" form of the tooth slot.

Although the present invention has been described in conjunction with non-generating face mill processes, the inventive concept also proves advantageous in generating face mill processes. In generating processes, a rotating tool is fed into the workpiece to a predetermined depth. Once this depth is reached, the tool and workpiece together undergo a rolling motion (i.e. a generating roll) along a path which emulates the rotation of the workpiece in mesh with a theoretical generating gear rotating about a generating gear axis with the tooth surfaces of the theoretical gear represented by the stock removing surfaces of the tool. The profile shape of the tooth is formed by relative motion of the tool and workpiece during the generating roll. The process is repeated for each tooth slot on the workpiece.

In all face milling generating processes it is necessary to include a separate indexing step when positioning a workpiece for generating each tooth slot. As with the prior art face milling described above, while indexing is occurring no machining is taking place and hence, machine time is wasted. Applying the present inventive method, while indexing, the tool is fed to full depth in the slot thus combining the heretofore separate indexing and in-feed steps into one step. With this procedure, cycle time and machine idle time are reduced.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of machining one or more tooth slots in a bevel gear-shaped workpiece by face milling with a generally cup-shaped tool having one or more stock removing surfaces, said method comprising:

indexing said workpiece by rotation about a workpiece axis of rotation to bring one of said tooth slots to a final machining position, simultaneously with at least a portion of said indexing, positioning said tool to contact said workpiece and commencing to machine said slot.

2. The method of claim 1 further comprising the step of:

infeeding said tool during said indexing while moving said tool with said indexing workpiece to maintain said tool positioned in said slot, said infeeding, moving of said tool, and indexing continuing at least until said final machining position is achieved.

3. The method of claim 2 wherein at least one of said infeeding, moving of said tool, and indexing continues subsequent to said final machining position being achieved.

4. The method of claim 2 further including the steps of:

relatively withdrawing said tool from said slot, and, repeating the steps of indexing, positioning, contacting, infeeding, moving and withdrawing for successive tooth slots of said workpiece.

5. The method of claim 4 wherein said indexing of said workpiece is continuous and said tool is relatively withdrawn from said slot immediately upon said final machining being achieved.

6. The method of claim 4 wherein said indexing of said workpiece is intermittent whereby upon achieving said final machining position, said workpiece rotation is stopped and said tool remains in said slot for a predetermined amount of time.

7. The method of claim 6 wherein subsequent to achieving said final machining position, said tool is fed further into said slot to a full depth position.

8. The method of claim 1 wherein said tool is a cutting tool.

9. The method of claim 1 wherein said tool is a grinding wheel.

10. The method of claim 1 wherein said tool and said workpiece are movable relative to one another linearly along three mutually perpendicular axes and angularly about a pivot axis.

11. A method of machining one or more tooth slots in a bevel gear-shaped workpiece with a generally cup-shaped tool having one or more stock removing surfaces, said method comprising:

indexing said workpiece by intermittent rotation about a workpiece axis of rotation to successively bring individual tooth slots to a final machining position, simultaneously with at least a portion of said indexing, positioning said tool to contact said workpiece and commencing to machine said slot, infeeding said tool during said indexing while moving said tool with said indexing workpiece to maintain said tool positioned in said slot, said infeeding, moving of said tool, and indexing continuing at least until said final machining position is achieved.

12. The method of claim 11 further comprising the steps of:

relatively withdrawing said tool from said slot, and, repeating the steps of indexing, positioning, contacting, infeeding, moving and withdrawing for successive tooth slots of said workpiece.

13. The method of claim 11 wherein subsequent to achieving said final machining position, said tool is fed further into said slot to a full depth position.

14. The method of claim 11 wherein said tool is a cutting tool.

15. The method of claim 11 wherein said tool is a grinding wheel.

* * * * *